United States Patent
Mueller et al.

(10) Patent No.: US 9,878,770 B2
(45) Date of Patent: Jan. 30, 2018

(54) AIRCRAFT FUSELAGE HAVING BURNTHROUGH RESISTANT COMPONENTS

(75) Inventors: Rainer Mueller, Rosengarten (DE);
Robert Huebner, Bremen (DE);
Heinz-Peter Busch, Weyhe (DE);
Marie-Laure Wawrzyniec,
Mondonville (FR)

(73) Assignees: Airbus Operations GmbH (DE);
Airbus S.A.S. (FR)

( * ) Notice: Subject to any disclaimer, the term of this patent is extended or adjusted under 35 U.S.C. 154(b) by 1325 days.

(21) Appl. No.: 12/935,107

(22) PCT Filed: Mar. 17, 2009

(86) PCT No.: PCT/EP2009/053122
§ 371 (c)(1),
(2), (4) Date: Dec. 14, 2010

(87) PCT Pub. No.: WO2009/118256
PCT Pub. Date: Oct. 1, 2009

(65) Prior Publication Data
US 2011/0121133 A1    May 26, 2011

Related U.S. Application Data

(60) Provisional application No. 61/072,320, filed on Mar. 28, 2008.

(30) Foreign Application Priority Data

Mar. 28, 2008    (DE) ........................ 10 2008 016 104

(51) Int. Cl.
*B64C 7/00*        (2006.01)
*B64C 1/06*        (2006.01)
(Continued)

(52) U.S. Cl.
CPC .............. *B64C 1/066* (2013.01); *B64C 1/068* (2013.01); *B64C 1/12* (2013.01); *B64C 1/18* (2013.01); *B64C 7/00* (2013.01); *Y02T 50/46* (2013.01)

(58) Field of Classification Search
USPC .......... 244/118.1, 119, 130, 131, 133, 129.1, 244/129.2; 52/783.13, 784.11, 783.1,
(Continued)

(56) References Cited

U.S. PATENT DOCUMENTS 4,557,961 A    12/1985    Gorges
4,767,656 A    8/1988    Chee et al.
(Continued)

FOREIGN PATENT DOCUMENTS

CN    1215681 A    5/1999
DE    102006020147 A1    11/2007
(Continued)

OTHER PUBLICATIONS

Marker et al.; Evaluating the Decomposition Products Generated Inside an Intact Fuselage During a Simulated Postcrash Fuel Fire; Jun. 2011; U.S. Department of Transportation.*
(Continued)

*Primary Examiner* — Tien Q Dinh
*Assistant Examiner* — Michael A. Fabula
(74) *Attorney, Agent, or Firm* — Lerner, David, Littenberg, Krumholz & Mentlik, LLP

(57) ABSTRACT

An aircraft fuselage includes at least one space arranged in the aircraft fuselage and at least one wall. The wall resists burnthrough for a period of at least four minutes from outside the aircraft fuselage towards the space, wherein the region of the aircraft fuselage underneath the space does not include burnthrough-resistant insulation. The space may be a cargo compartment of the aircraft or a passenger cabin, (Continued)

Figure 1:
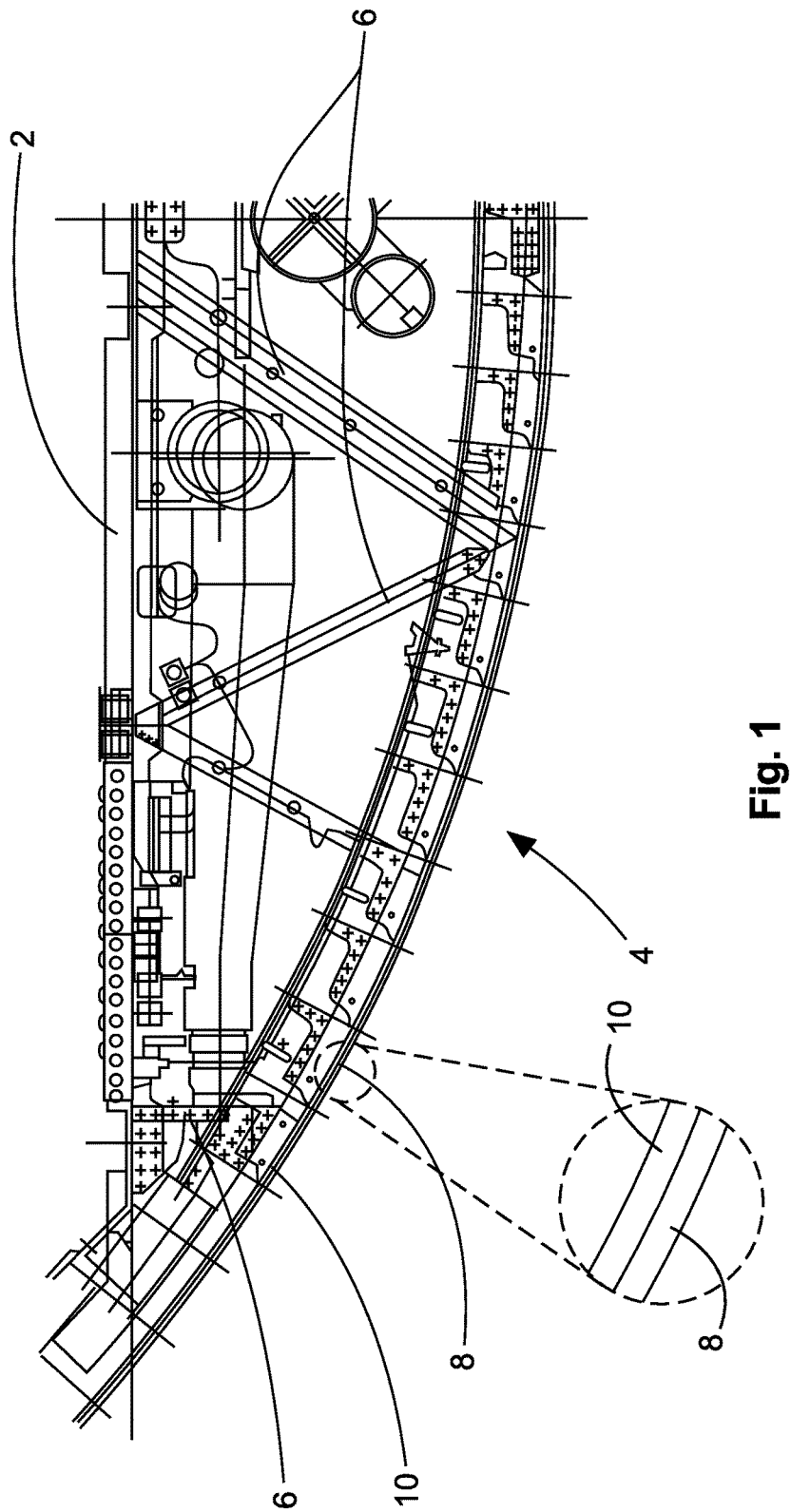

while the wall may be designed as a cargo compartment floor, passenger cabin floor or wing/fuselage fairing (belly fairing). The design of the aircraft fuselage results in burnthrough resistance that meets the requirements of FAR §25.856 (b) without any additional burnthrough-resistant insulation in the aircraft fuselage.

3 Claims, 4 Drawing Sheets

(51) Int. Cl.
    *B64C 1/12* (2006.01)
    *B64C 1/18* (2006.01)
(58) Field of Classification Search
    USPC .............................. 52/787.11; 428/920, 921
    See application file for complete search history.

(56) References Cited

U.S. PATENT DOCUMENTS

| | | | |
|---|---|---|---|
| 4,794,032 A * | 12/1988 | Fujii et al. | 428/209 |
| 5,542,626 A * | 8/1996 | Beuck et al. | 244/107 |
| 5,562,264 A | 10/1996 | Bietenhader | |
| 6,029,933 A | 2/2000 | Holman et al. | |
| 6,149,971 A * | 11/2000 | Lusardi | 427/195 |
| 6,611,659 B2 * | 8/2003 | Meisiek | 392/435 |
| 6,834,159 B1 | 12/2004 | Schramm | |
| 6,835,676 B2 * | 12/2004 | Kim et al. | 442/70 |
| 6,855,393 B1 * | 2/2005 | Ayres | 428/116 |
| 6,863,980 B2 * | 3/2005 | Misciagna et al. | 428/408 |
| 7,284,726 B2 * | 10/2007 | Fabian et al. | 244/17.11 |
| 7,291,373 B2 * | 11/2007 | Bartley-Cho et al. | 428/61 |
| 7,407,135 B2 * | 8/2008 | Rouyre | 244/119 |
| 7,767,597 B2 * | 8/2010 | Garvey | 442/2 |
| 7,977,263 B2 * | 7/2011 | Lewis | 501/69 |
| 7,988,809 B2 * | 8/2011 | Smith et al. | 156/292 |
| 8,056,850 B2 * | 11/2011 | Lin et al. | 244/1 N |
| 8,128,029 B2 * | 3/2012 | Jimenez Del Lago et al. | 244/119 |
| 8,205,836 B2 * | 6/2012 | Brinkmann et al. | 244/129.2 |
| 8,292,214 B2 * | 10/2012 | Lin et al. | 244/1 N |
| 2002/0017590 A1 | 2/2002 | Fay et al. | |
| 2002/0148928 A1 | 10/2002 | Oki | |
| 2002/0195525 A1 | 12/2002 | Anton et al. | |
| 2004/0258498 A1 | 12/2004 | Bruns | |
| 2005/0224637 A1 | 10/2005 | Fabian et al. | |
| 2006/0046598 A1 * | 3/2006 | Shah | 442/394 |
| 2006/0065784 A1 * | 3/2006 | Rouyre | 244/119 |
| 2006/0214058 A1 * | 9/2006 | Westre et al. | 244/119 |
| 2007/0166526 A1 | 7/2007 | Myard et al. | |
| 2007/0275843 A1 * | 11/2007 | Lewis | 501/70 |
| 2008/0061189 A1 | 3/2008 | Schoke | |
| 2008/0099610 A1 * | 5/2008 | Jimenez Del Lago et al. | 244/119 |
| 2008/0166937 A1 * | 7/2008 | Garvey | 442/1 |
| 2008/0210820 A1 * | 9/2008 | Kismarton et al. | 244/120 |
| 2009/0026787 A1 | 1/2009 | Muller et al. | |
| 2009/0050741 A1 | 2/2009 | Muller | |
| 2009/0072086 A1 * | 3/2009 | Smith et al. | 244/119 |
| 2009/0184206 A1 * | 7/2009 | Lin et al. | 244/158.1 |
| 2010/0065688 A1 * | 3/2010 | Wood | 244/131 |
| 2010/0209679 A1 * | 8/2010 | Tompkins | 428/201 |
| 2010/0276539 A1 * | 11/2010 | Brinkmann et al. | 244/121 |
| 2011/0062287 A1 * | 3/2011 | Metzech et al. | 244/133 |
| 2011/0114342 A1 * | 5/2011 | Ono et al. | 169/45 |
| 2011/0133031 A1 * | 6/2011 | Shah et al. | 244/119 |
| 2011/0274863 A1 * | 11/2011 | Busch et al. | 428/41.7 |
| 2012/0128959 A1 * | 5/2012 | Fernando et al. | 428/219 |
| 2012/0214660 A1 * | 8/2012 | Lewis | 501/35 |
| 2012/0276368 A1 * | 11/2012 | Fernando et al. | 428/319.1 |
| 2012/0318921 A1 * | 12/2012 | Rohrbach et al. | 244/129.2 |
| 2013/0045352 A1 * | 2/2013 | Kern et al. | 428/76 |

FOREIGN PATENT DOCUMENTS

| | | |
|---|---|---|
| EP | 1604900 A1 | 12/2005 |
| JP | 07-329197 | 12/1995 |
| JP | 2004359227 A | 12/2004 |
| JP | 2006519911 A | 8/2006 |
| JP | 2007505772 A | 3/2007 |
| RU | 2006127017 A | 2/2008 |
| WO | 0194200 A1 | 12/2001 |
| WO | 2004081103 A2 | 9/2004 |
| WO | 2007031321 A1 | 3/2007 |

OTHER PUBLICATIONS

Quintiere et al.; Flammability Properties of Aircraft Carbon-Fiber Structural Composite; Oct. 2007; U.S. Department of Transportation.*
Robert Ochs; Development of a Lab-Scale Flame Propagation Test for Composite Fuselages; Oct. 21, 2008; Federal Aviation Administration.*
FAR Section 25.856 and Part VII of Appendix F; 2003 and 1972 respectively; Federal Aviation Administration.*
GRP Glass Reinforced Plastic; <http://wwww.theseacpages.co.uk/grp.aspx>.*
Wulliman et al.; Insulation Materials for Burnthrough Protection; 1998; Johns Manville Corporation.*
Theo Klems; European Programme on Improvement of Fuselage Burn Through Resistance; 1998; Airbus Industrie.*
Federal Aviation Administration; Installation of Thermal/Acoustic Insulation for Burnthrough Protection; AC 25.856-2; Jan. 17, 2006.*
Gunter, Lori; Dustbusters! How trusting employees and applying environmental innovation resulted in a better workplace; Boeing; Boeing Challenge Magazine; Jul. 2007; vol. 6, Issue 3, pp. 44-45.*
Boeing Frontiers Archive; Online access to Challenge Magazine; <http://www.boeing.com/news/frontiers/archive/2007/july/ts_challenge.html.> Feb. 28, 2008.*

* cited by examiner

AIRCRAFT FUSELAGE HAVING BURNTHROUGH RESISTANT COMPONENTS

CROSS-REFERENCE TO RELATED APPLICATIONS

This application is a national phase entry under 35 U.S.C. §371 of International Application No. PCT/EP2009/053122, filed Mar. 17, 2009, published in English, which claims the benefit of the filing date of German Patent Application No. 10 2008 016 104.7 filed Mar. 28, 2008 and of the U.S. Provisional Patent Application No. 61/072,320 filed Mar. 28, 2008, the disclosures of which applications are hereby incorporated herein by reference.

TECHNICAL FIELD OF THE INVENTION

The invention relates to an aircraft fuselage.

TECHNOLOGICAL BACKGROUND OF THE INVENTION

Due to recent aviation regulations, in particular FAR §25.856 (b), passenger aircraft with a passenger capacity of 20 or greater must be constructed so that they are burnthrough-resistant. This means that for a period of at least four minutes, flame penetration of the aircraft from the exterior to the interior into the cabin must be prevented, for example if after an emergency landing there is a fire on the outside of the aircraft, which fire acts on the aircraft fuselage.

The aluminium aircraft-structures that are commonly used experience burnthrough after approximately 60 seconds so that after this period of time it is possible for flames acting on the aircraft fuselage to enter the interior of the aircraft. In order to prevent this, for the purpose of protecting a passenger cabin, burnthrough-resistant insulation materials for the lower half of the passenger fuselage are mandatory. However, burnthrough-resistant insulation materials that are suitable for this purpose are associated with additional expenditure in the construction of the aircraft, and furthermore result in additional weight because, for example, insulation mats need to comprise special burnthrough-resistant film or foil and film or foil attachment devices. This in turn, overall, increases the aircraft's weight and thus negatively affects the performance, the economy and maintainability of the aircraft. Furthermore, the arrangement of insulation mats that comprise burnthrough-resistant film or foil underneath the cargo compartment region (in the bilge of the fuselage) is not recommended, because a considerable amount of humidity collects in this region, which humidity would be absorbed by the insulation mats. This would result in a gradual increase in the weight of the insulation mats, and drainage would be rendered more difficult.

SUMMARY OF THE INVENTION

It is thus the object of the invention to propose an aircraft fuselage that is burnthrough resistant for a period of at least four minutes, in which aircraft fuselage, at least in some regions underneath cargo spaces, there is no need to use insulation mats that are designed to be burnthrough resistant.

Burnthrough resistance in the passenger cabin is provided by a burnthrough-resistant wall that resists burnthrough for a period of at least four minutes from outside the aircraft fuselage into a space in the interior of the aircraft fuselage. In a first embodiment this may be implemented by a burnthrough-resistant cargo compartment floor which achieves corresponding burnthrough resistance in a cargo compartment or in a passenger cabin. Since a passenger cabin of an aircraft is usually arranged above a cargo compartment, if a burnthrough-resistant cargo compartment floor is provided, a fire located underneath the cargo compartment would not be able to penetrate the cargo compartment and thus would also not be able to penetrate the passenger cabin. A suitable burnthrough-resistant cargo compartment floor could comprise cargo-compartment floor panels that are made from suitable materials, which floor panels on the one hand feature high strength, while on the other hand providing adequate burnthrough resistance. For example, carbon fibre materials or glass fibre materials may be considered for this, which materials may be applied in the form of woven-fabric structures, laminates, sandwich structures or the like. Preferably, the weight of the floor panels used in the context of the invention is identical to the weight of conventional cargo-compartment floor panels, so that this does not result in additional weight.

Since cargo compartment floors also comprise regions without floor panels, for example regions that comprise roller conveyors or ball-element mats for the transport of containers, these regions preferably need to be rendered burnthrough resistant with the use of other means. For this purpose, among other things, thin glass fibre mats and/or carbon fibre mats or laminates underneath the above-mentioned structures could be used. Since these particular areas without floor panels cover only a relatively small part of the cargo compartment floor, the production expenditure and also the additional weight resulting from the special burnthrough materials in the regions without floor panels are less than the additional weight after fitting the entire underfloor region of the aircraft with separate burnthrough-resistant insulation mats. In addition, conventional insulation mats in the underfloor region may become soiled very quickly and may absorb a lot of liquid, which could encourage corrosion and could also negatively affect the characteristics of the product. The use of such insulation mats would also be associated with disadvantages relating to installation and maintenance, because these components are easily damaged so that the production- and maintenance costs are considerably lower with the use of the solution according to the invention than would be achieved with burnthrough-resistant insulation mats.

In a further embodiment of the invention, as an alternative the floor panels of the passenger cabin are designed so that they are burnthrough resistant. To this effect the same materials may be used as for burnthrough protection on the cargo compartment floor. However, the burnthrough protection on the passenger cabin is associated with a very considerable advantage in that even less burnthrough-resistant insulation needs to be provided than is the case in the first embodiment.

In a further embodiment of the present invention, adequate burnthrough protection, at least in the region of the wing/fuselage transition, may be implemented in that the aerodynamic protective fairing provided in that location, also referred to as the "belly fairing" is produced from suitable glass fibre structures or carbon fibre structures, similar to those in the preceding exemplary embodiments. Thus the belly fairing may be modified to the effect that it comprises outstanding characteristics relating to burnthrough resistance. Consequently, in this region too it is possible to do without burnthrough-resistant insulation, which saves weight and also expenditure during manufacture. The detail design of the fairing may have to be modified in some locations so that it may be ensured that flame penetration at the existing gaps in the fairing becomes impossible, and thus, in the case of a fire located underneath the aircraft fuselage and acting from the outside to the inside the passenger cabin is completely protected. These modifications relate, for example, to the reduction in the gap dimensions of the fairing components, to the integration of overlapping areas in fairing components and the like, so that flame penetration cannot occur.

SHORT DESCRIPTION OF THE DRAWINGS

Figure 2:
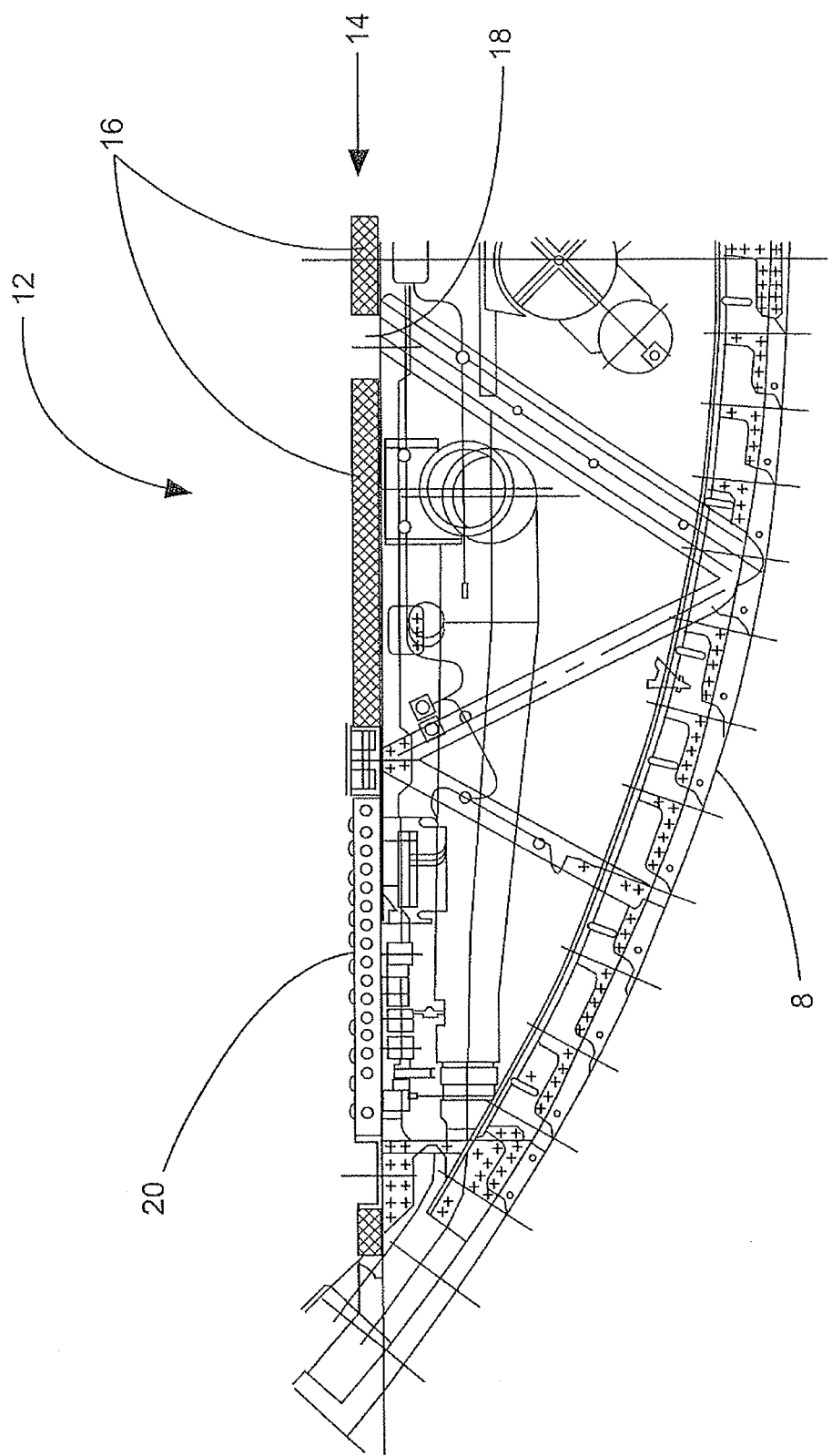
Figure 3:
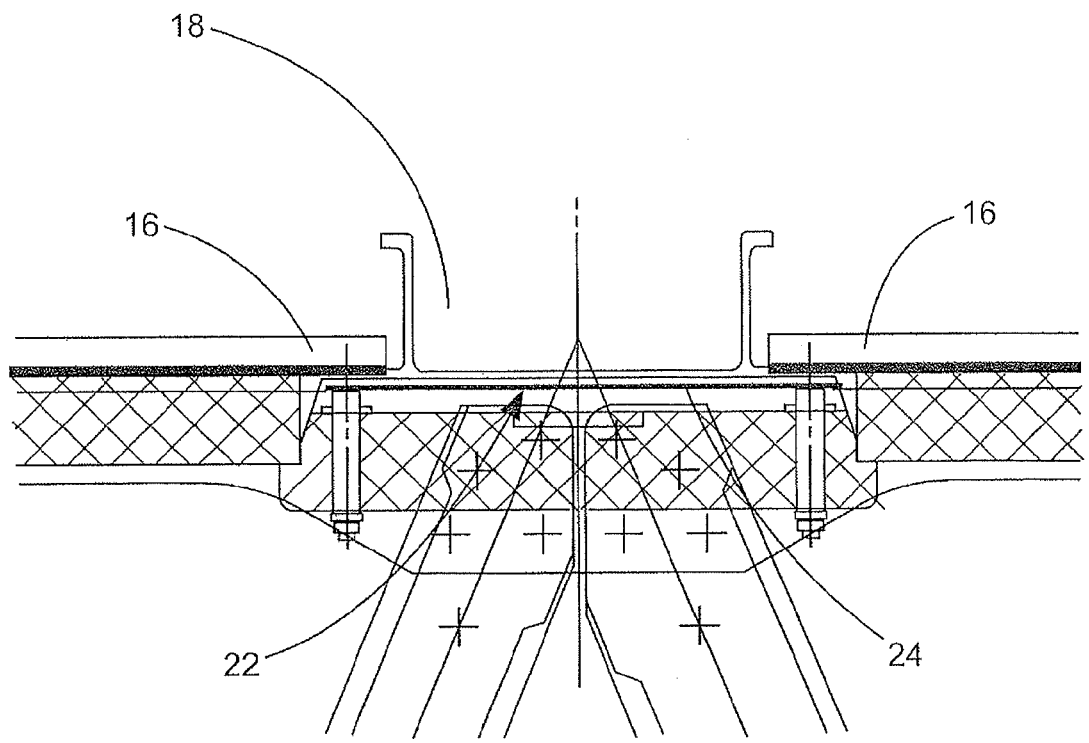
Figure 4A:
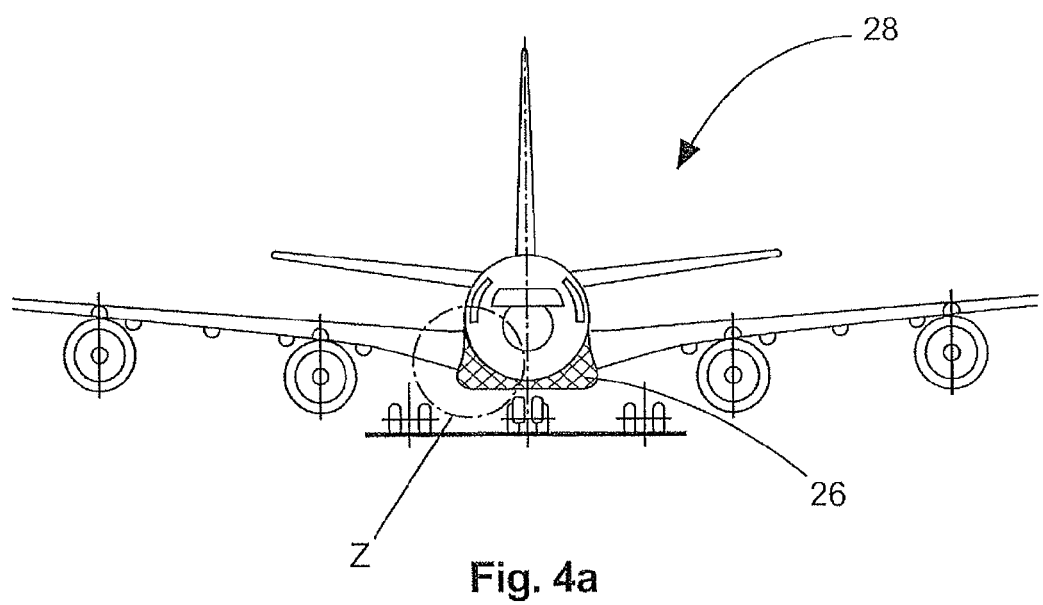
Figure 4B:
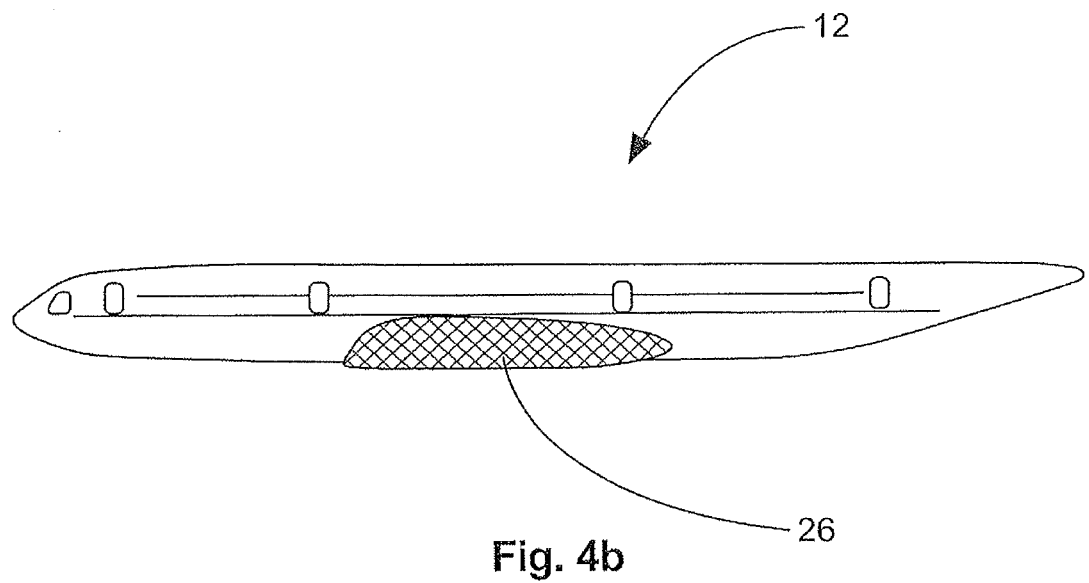
Figure 4C:
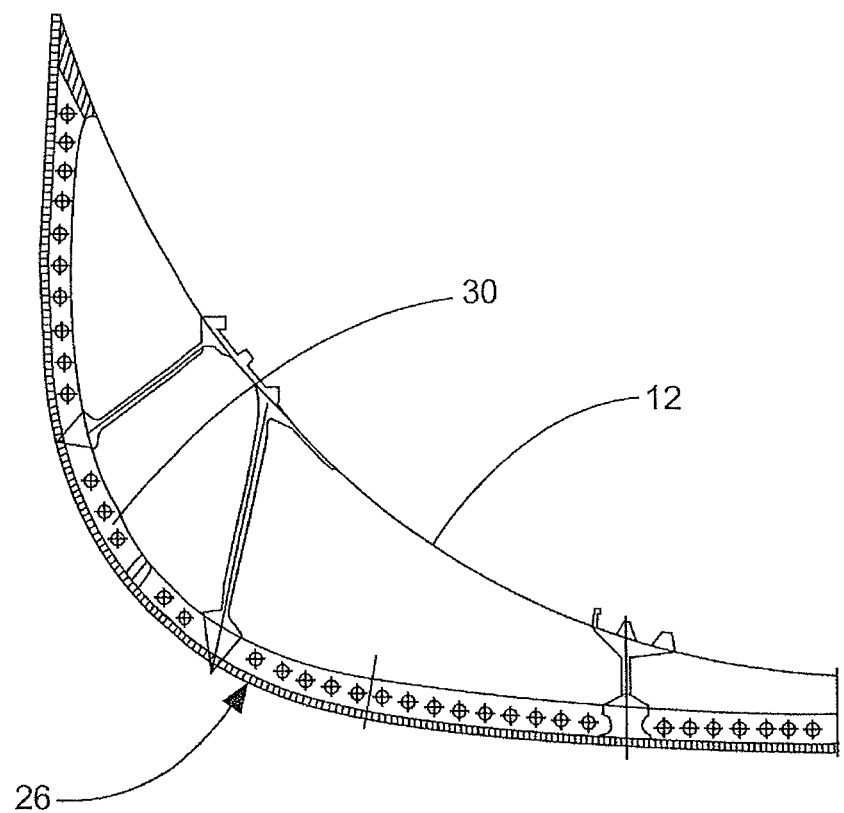

Below, the invention is explained in more detail with reference to figures. In the figures, the same reference characters are used for identical objects. The following are shown:

FIG. 1: a diagrammatic view of the lower fuselage region in the state of the art;

FIG. 2: a diagrammatic view of the lower region of a burnthrough-resistant aircraft fuselage according to the invention;

FIG. 3: a section of a cargo-compartment floor region comprising a roller conveyor;

FIGS. 4a to c: a belly fairing of a burnthrough-resistant aircraft fuselage according to the invention.

DETAILED DESCRIPTION OF EXEMPLARY EMBODIMENTS

FIG. 1 in an exemplary manner shows a section of an aircraft fuselage 4 that comprises a cargo compartment floor 2 which is connected to an exterior skin 8 by way of various structural components 6. The state of the art provides for establishing burnthrough resistance in that the exterior skin 8 comprises burnthrough-resistant fuselage insulation 10. This fuselage insulation 10 could, for example, comprise insulating packages comprising a special burnthrough-resistant material, which insulating packages may satisfy the requirements for burnthrough resistance at least for the mandatory period of 4 minutes. The burnthrough-resistant fuselage insulation 10 makes possible evacuation of an aircraft, for example after an emergency landing, which evacuation should be completed in considerably less time than it takes a fire located outside the aircraft fuselage 4 to penetrate the fuselage.

The aircraft fuselage 12 according to the invention, which aircraft fuselage 12 is shown in FIG. 2, in the first exemplary embodiment comprises burnthrough-resistant cargo-compartment floor panels 16 on the cargo space floor 14, which cargo-compartment floor panels 16 extend over a large region of the width of the cargo compartment floor. However, some regions of the cargo compartment floor do not comprise floor panels 16, but instead are equipped with roller conveyors 18 and ball-element mats 20 for easy displacement of containers within the cargo compartment. In these regions, burnthrough resistance may be achieved only with the use of other measures, for example by integrating burnthrough-resistant film or foil underneath the roller conveyors 18, ball-element mats 20 or other installations. Overall, in this way the entire cargo compartment floor 14 may be constructed so as to be burnthrough resistant; there is no longer a need to provide the separate insulation 10 shown in FIG. 1.

While in the above arrangement a fire located outside the aircraft fuselage could enter the interior of the aircraft fuselage 12 through the exterior skin 8, it could not however penetrate the cargo compartment floor 2 according to the invention in order to reach a cabin region situated above it.

FIG. 3 shows a region of the cargo compartment floor 2 with a roller conveyor 18 which is laterally adjoined by burnthrough-resistant cargo-compartment floor panels 16. On the underside 22 of the roller conveyor 18 a burnthrough-resistant film or foil 24 is arranged, which supplements the adjacent burnthrough-resistant cargo-compartment floor panels 16 so that a fully closed area results. Preferably, the film or foil 24 overlaps the floor panel 16 in the region of its transition to the roller conveyor 18 so that at this position there is no gap through which a fire projecting into the cargo space could penetrate the cargo compartment floor 14. Apart from the underside 22 of the roller conveyor 18, preferably all the other installations of the cargo compartment floor 14 where no cargo-compartment floor panels 16 may be installed are also equipped with such film or foil.

The burnthrough-resistant film or foil 24 may also be designed as a laminate or a woven fibre material. The thickness of the film or foil 24 is preferably not too thin, so that damaging the film or foil 24 at the time of installation, or when carrying out aircraft maintenance, may be prevented.

A further option for implementing burnthrough protection without the use of burnthrough-resistant insulation is provided by a burnthrough-resistant design of the wing/fuselage fairing 26, also referred to as the "belly fairing", of an aircraft 28, which fairing 26 is diagrammatically shown in FIGS. 4a to 4c in front view and lateral view of the aircraft 28, and in a detailed view of the fairing 26. The belly fairing 26 is primarily designed to keep the transition between the wing roots and the aircraft fuselage aerodynamically as smooth as possible so that airflow losses in this region are kept within limits. A burnthrough-resistant design of this belly fairing 26 eliminates, at least in this region of the fuselage 12 according to the invention, the need for additional insulation mats on the inside, and thus supplements the burnthrough-resistant cargo compartment floor 14 in the fuselage regions adjacent to the belly fairing 26.

The selection of materials for the belly fairing 26 may be handled very flexibly, because by means of a corresponding additional auxiliary structure 30 the belly fairing 26 is given adequate stability. It is not necessary for the material of the outer skin of the belly fairing 26 to provide the mechanical stability by itself, so that consequently there are no restrictions in the selection of materials. Preferably a woven glass-fibre material or a woven carbon-fibre material is used, in which as a result of corresponding tests an adequate period of resistance to burnthrough, namely at least four minutes, has been demonstrated.

Lastly, apart from equipping a cargo compartment floor 14 with burnthrough-resistant floor panels 16 and burnthrough-resistant film or foil 24, equipping a passenger cabin floor that is arranged above it is imaginable and sensible where in some regions no cargo compartment is present or where an underfloor region in the aircraft is used as a passenger cabin, or in order to additionally save materials and costs.

With the measures described, in relation to meeting current burnthrough requirements according to FAR §25.856 (b), without additional burnthrough-resistant insulation burnthrough-protection of an aircraft may be achieved. All the fasteners and special burnthrough-resistant materials in the insulation, which fasteners and materials would otherwise be necessary for this, may be done without. In this way costs and weight are saved, so that the aircraft, while maintaining an identical safety standard, may at least achieve the same payload and may at least achieve the same fuel consumption figures. Production and maintenance of the aircraft is considerably simplified, in particular because it is no longer necessary to provide burnthrough-resistant insulation in the region of the underfloor of the aircraft.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 Cargo compartment floor
4 Aircraft fuselage
6 Structural component
8 Exterior skin
10 Insulation material
12 Aircraft fuselage (according to the invention)
14 Cargo compartment floor
16 Floor panel
18 Roller conveyor
20 Ball-element mat
22 Underside of roller conveyor
24 Burnthrough-resistant film or foil
26 Belly fairing (wing/fuselage fairing)
28 Aircraft
30 Auxiliary structure of belly fairing (wing/fuselage fairing)

The invention claimed is:

1. An aircraft fuselage, comprising:
   at least one space;
   a floor arranged in the aircraft fuselage; and
   a fairing of a transition between a wing and the aircraft fuselage;
   wherein the fairing is configured to prevent flame penetration therethrough for a period of at least four minutes from outside the aircraft fuselage towards the space; and
   wherein a region of the space of the fuselage immediately above the fairing does not include an insulation configured to prevent flame penetration therethrough for a period of at least four minutes.

2. A wing-fuselage fairing or belly fairing of an aircraft, comprising:
   a wall configured to prevent flame penetration therethrough into an aircraft fuselage for a period of at least four minutes.

3. The wing-fuselage fairing or belly fairing of claim 2, wherein the wall is made from carbon fibre materials or glass fibre materials in the form of at least one woven-fabric structures, laminates, or sandwich structures.

* * * * *